No. 705,914. Patented July 29, 1902.
J. C. FLEMING.
DRYING APPARATUS.
(Application filed Jan. 12, 1901. Renewed Dec. 23, 1901.)

(No Model.) 2 Sheets—Sheet 1.

Witnesses:-

Inventor:-
John C. Fleming
by his Attorneys

No. 705,914. Patented July 29, 1902.
J. C. FLEMING.
DRYING APPARATUS.
(Application filed Jan. 12, 1901. Renewed Dec. 23, 1901.)

(No Model.) 2 Sheets—Sheet 2.

Witnesses:—
Frank L. A. Graham
Louis M. F. Whitehead

Inventor:—
John C. Fleming
by his Attorneys:—

UNITED STATES PATENT OFFICE.

JOHN C. FLEMING, OF NEW YORK, N. Y.

DRYING APPARATUS.

SPECIFICATION forming part of Letters Patent No. 705,914, dated July 29, 1902.

Application filed January 12, 1901. Renewed December 23, 1901. Serial No. 86,998. (No model.)

*To all whom it may concern:*

Be it known that I, JOHN C. FLEMING, a citizen of the United States, and a resident of New York city, New York, have invented certain Improvements in Drying Apparatus, of which the following is a specification.

The object of my invention is to construct an apparatus for thoroughly and quickly drying materials, the machine being so constructed that the material will be carried through the machine in a continuous stream and will be subjected to heat *in vacuo*. This object I attain in the following manner, reference being had to the accompanying drawings, in which—

Figure 1:
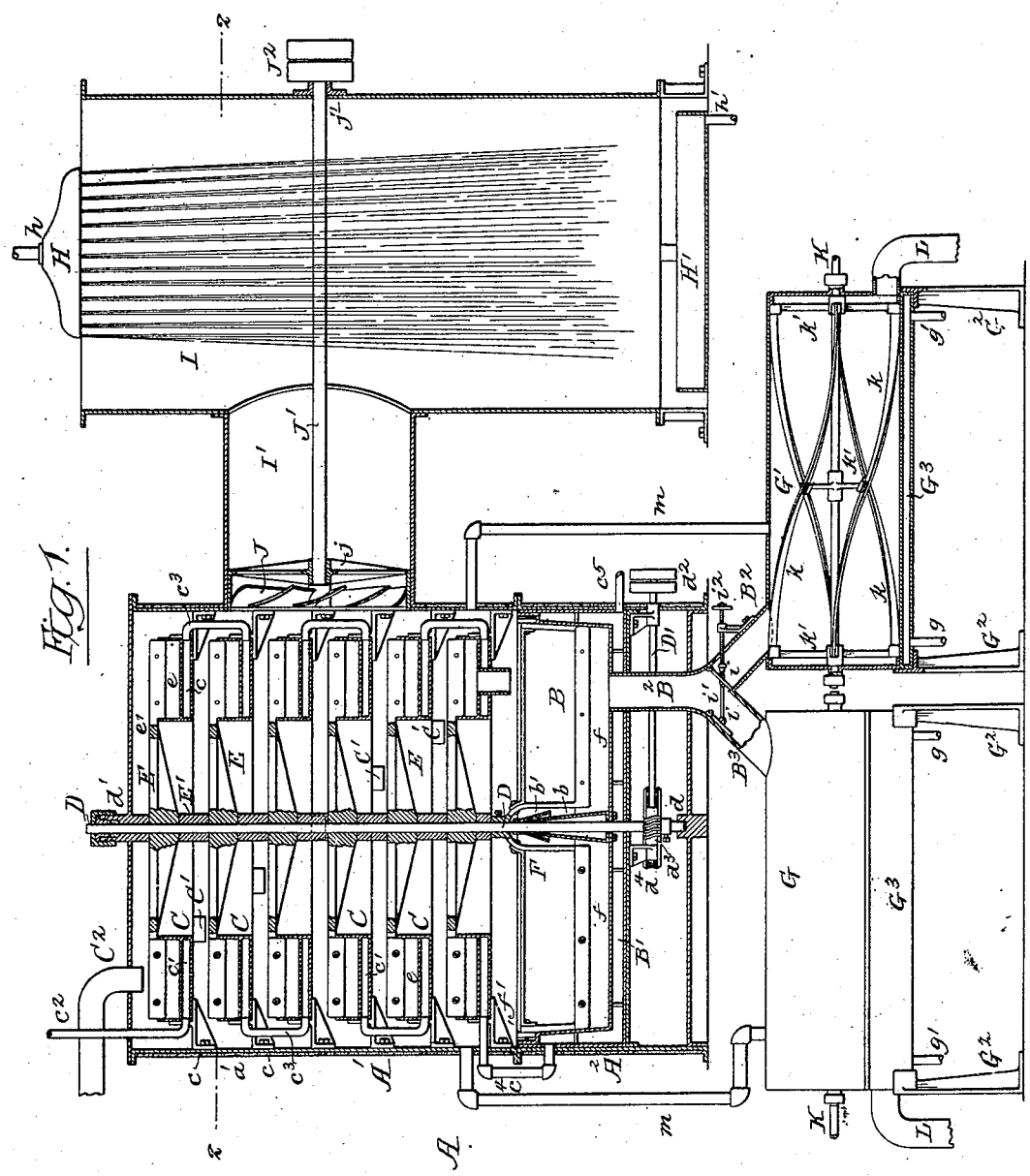
Figure 2:
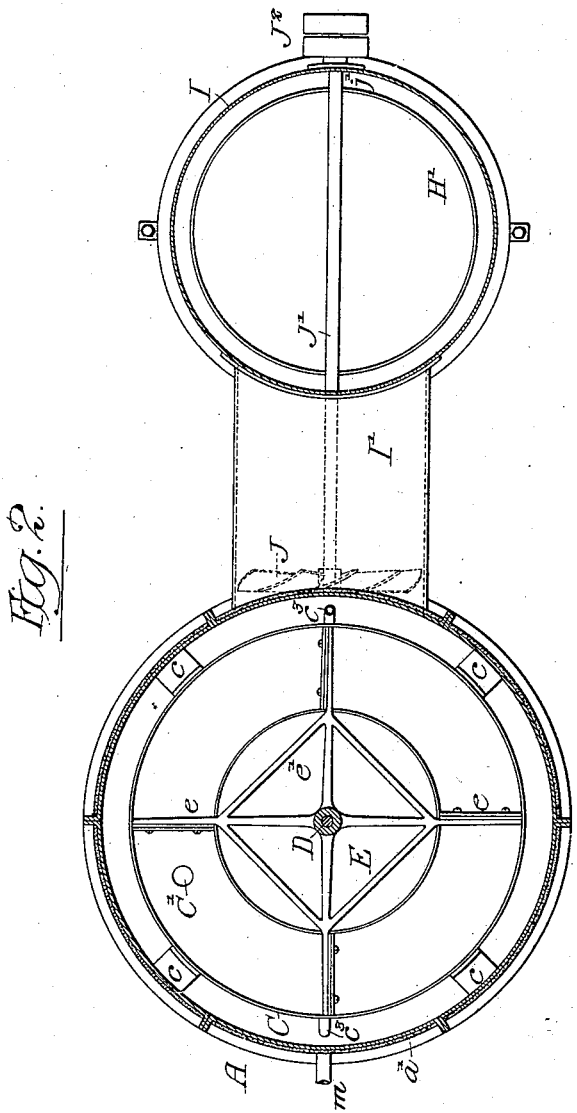

Figure 1 is a sectional elevation of my improved apparatus; and Fig. 2 is a sectional plan view on the line 2 2, Fig. 1.

My invention is based upon the patent granted to me on the 26th day of June, 1900, No. 652,536, for improvements in evaporating apparatus.

A is the vacuum-chamber, having a casing made up of flanged metallic parts or sections secured together in any suitable manner and surrounded by a non-conducting covering $a'$. The casing is made in two parts $A'$ $A^2$, the lower part containing the pan B and the upper part containing a series of annular troughs C. These troughs C are supported on brackets $c$, projecting from the casing. There may be as many of these troughs as desired, the number depending greatly upon the material being treated. I have shown six troughs in the present instance. Each trough is quadrangular in cross-section and is made of metal, and under the bottom of each trough is a steam-chamber $c'$. $c^2$ is a steam-supply pipe connected to the steam-chamber of the upper trough, and the several troughs are connected by pipes $c^3$, so that the water of condensation will flow through the several troughs to the outlet-pipe $c^4$, which communicates with the jacket $B'$ of the pan B. The water of condensation is exhausted from this pan through an outlet-pipe $c^5$. Thus each of the troughs C is independently heated, and the material that is conveyed in the troughs is heated to a certain degree.

$C'$ represents outlet-openings in each trough. These outlet-openings are staggered, as clearly shown.

$C^2$ is an inlet-pipe from which the material is discharged onto the upper trough C. The material is then conveyed by this trough and discharged into the next lower one throughout the series and finally discharged through the lowermost outlet $C'$ into the pan B. The material can be either forced through the pipe $C^2$ by a pump or can be fed from a hopper. The ingress of air at this point must be prevented, so as not to break the partial vacuum formed in the chamber.

D is a vertical shaft mounted in a step-bearing $d$ at the lower end and a packed bearing $d'$ at the upper end. This shaft is driven by a driving-shaft $D'$, having fast and loose pulleys $d^2$. On the shaft $D'$ is a worm $d^3$, meshing with the worm-wheel $d^4$ on the shaft D.

Carried by the shaft D is a series of arms E, having at their outer ends blades $e$, which travel in the troughs C and convey the material from the inlet to the outlet opening. The arms are suitably stayed by braces $e'$, and the blades are so mounted on the arms that they will simply rest upon the bottom of the trough by their own weight, and any vertical displacement of the shaft and its arms will not affect the bearing of the blades. This construction is fully set forth and described in a companion application filed by me on the 11th day of January, 1901, Serial No. 42,878. The arms E are suitably spaced by sleeves $E'$.

F is a frame secured to the shaft D and carrying the blades $f$, which travel in the pan B. These blades are mounted similarly to the blades $e$, so that any vertical displacement of the shaft will not affect the blades $f$. The frame F has rollers $f'$, which travel on the flanged edge of the pan B. Projecting upward from the center of the pan is a conical deflector $b$, and on the shaft is a conical hood $b'$, which overlaps the deflector $b$. This construction protects the lower bearing and the driving-gear.

At one side of the vacuum-chamber A is a condenser I, connected to the vacuum-chamber by a large pipe $I'$, in which is a suction-fan J. This fan is mounted on the shaft $J'$, which has its bearings in the spider $j$, secured to the pipe $I'$, and in bearings $j'$ on the casing of the condenser I on the shaft $J'$ are fast and loose pulleys $J^2$, through which the shaft is driven. The condenser I is open at top and bottom, as clearly shown in the drawings, and situated above the condenser is a spray-head H, connected to a water-supply pipe $h$, and directly under the bottom of the condenser is a pan H', connected to a waste-pipe $h'$. Water is sprayed from the head through the condenser, so that when the fan draws off the vapor from the vacuum-chamber A the vapors coming in contact with the cold water will condense and be carried off through the waste-pipe $h'$. In some instances the condenser may be dispensed with and simply the pipe I' and its fan used. The vapor will then be simply passed to the atmosphere.

Under the vacuum-chamber A are two finishing-receivers G G', connected to the outlet-passage B² from the pan by passages $b^3$, controlled by a double valve $i\ i$. The two valves are hinged to the casing and connected together by a rod $i'$ and operated by a screw-stem $i^2$, so as to direct the material either into the receiver G or the receiver G'. In the drawings I have shown the valves so adjusted as to direct the material into the receiver G. In the present instance the receivers are mounted on suitable supports G², and I jacket the lower portion of each receiver at G³, connecting the jacket with steam supply and exhaust pipes $g\ g'$.

K is a driven shaft extending through each receiver, and the shaft has its bearings in the casing, and on the shaft are a series of curved blades $k$, in the present instance supported by arms $k'$, which keep the material in constant motion in the receivers. At the end opposite the inlet end of each receiver is the discharge spout or pipe L, so that when one receiver is being charged with dried material from the pan B the discharge-pipe is closed and the material is allowed to accumulate in the receiver, and the material is agitated by the blades and brought in contact with the jacketed surface of the receiver, so that if any particles have not been thoroughly dried in the vacuum-chamber the drying will be completed in the receivers. I preferably connect each receiver by a pipe $m$ to the vacuum-chamber, so that the finishing process will be carried on *in vacuo*, as well as the first drying.

I preferably where possible heat the liquid or material to be treated before it enters the chamber A. The material to be treated drops into the annular troughs and is carried over the heated surface of each trough by the blades, which are traversed through the troughs by the rotation of the shaft D. As the material drops into the troughs it covers a wide surface and is only a very thin body. Therefore it is quickly heated, and in travelling around and dropping from one pan to the other there is a large amount of vapor given off, and as this vapor is given off it is carried away by the exhaust-fan. The fan is so proportioned to the chamber as to immediately carry off the vapor as soon as it is given off. This vapor is allowed to pass into the air or carried through the pipe I' into the condensing-chamber I, and the spray of cold water will cause the vapor to immediately condense and pass off with the waste water. The material to be dried keeps on its downward course through the several troughs until it reaches the pan B, and from the pan it is discharged into either one of the finishing-receivers. As one receiver is charged it is shut off from the vacuum-chamber and another is used, while the first-mentioned receiver is emptied. In this way there is a continuous action without any stop of the machinery, and consequently the work will be accomplished quickly and fuel and labor will be economized. By causing the material to pass over the surface of the heated portion in a thin layer it will be seen that the vapor has a less resistance than if a large body of material was stored in one vessel, and consequently the work is accomplished very much more rapidly and with a decrease in the cost of operation.

The agitators in the finishing-receivers may in some instances be dispensed with; but I prefer to provide some means of agitating the material while it is in the receivers and, furthermore, to provide means for discharging the material from the receivers when necessary.

I claim as my invention—

1. The combination of a closed chamber having a series of annular troughs therein, one mounted above another, a pan in the lower portion of the chamber, a jacket for said pan, a steam-chamber under each of the troughs, a steam-supply pipe for said chambers and jacket, a driven shaft, blades carried by said shaft and arranged to travel in said troughs and the pan, a supply-pipe discharging material into the upper trough, outlet-openings in each trough, a pipe communicating with the pan, a comparatively large pipe forming an outlet from the closed chamber between the upper and lower troughs, a spider-like piece in said pipe, a shaft having a bearing in said piece, and an exhaust-fan on the said shaft in the pipe operating to draw the vapors from the body of the closed chamber, substantially as described.

2. The combination of a closed chamber having a series of annular troughs therein, one mounted above another, a pan in the lower portion of the casing, means for heating the troughs and the pan, means for carrying off the vapor, a finishing-receiver under the chamber and communicating with the pan, and a shaft running therethrough carrying curved blades for agitating the material in the receiver, substantially as described.

3. The combination of a closed chamber, a series of troughs therein, a pan in the lower portion of the chamber, means for conveying material in the troughs to the pan, means for carrying off the vapor, two finishing-receivers mounted below the chamber and communicating therewith, and a valve for directing the material from the pan into either one of the finishing-receivers, substantially as described.

4. The combination of a closed chamber, a series of troughs therein, means for conveying material in the troughs, one trough discharging into another, means for heating the material in the troughs, a fan for carrying off the vapors, two finishing-receivers communicating with the lowermost trough or pan, a valve for directing the material into either one or the other of the receivers, and agitating means in each receiver, substantially as described.

5. The combination of a closed chamber, a series of troughs therein, means for conveying material in the troughs, one trough discharging into another, means for heating the material in the troughs, a fan for carrying off the vapors, two finishing-receivers communicating with the lowermost trough or pan, a valve for directing the material into either one or the other of the receivers, agitating means in each receiver, and steam-jackets inclosing the lower portion of each receiver, substantially as described.

6. The combination of a closed chamber, a series of troughs therein, means for conveying material in the troughs, one trough discharging into another, means for heating the material in the troughs, a fan for carrying off the vapors, two finishing-receivers communicating with the lowermost trough or pan, a valve for directing the material into either one or the other of the receivers, agitating means in each receiver, steam-jackets inclosing the lower portion of each receiver, and pipes connecting each receiver with the closed chamber, substantially as described.

7. The combination of a closed chamber, a series of troughs, one arranged below another, a pan in the lower portion, a steam-chamber for the troughs and a steam-jacket for the pan, a vertical shaft, arms thereon having blades arranged to travel in the several troughs and pan, outlet-openings in each trough, a supply-pipe for the material to be treated, an outlet-pipe for the material, a condenser, a water-spray device in the same, a comparatively large pipe forming communication between the chamber and the condenser, a spider-like piece therein, a shaft having a bearing in said piece, and an exhaust-fan on the shaft in said pipe, substantially as described.

8. The combination of a closed chamber, a series of troughs therein, one mounted above another, a steam-chamber under the bottom of each trough, a steam-supply pipe for the upper chamber and pipes communicating the several chambers, a pan under the troughs, a jacket for said pan communicating with the steam-chamber of the lowermost trough, a vertical shaft, blades on said shaft arranged to travel in the troughs, a pan, outlet-openings in each trough, a feed-pipe for the material so that material fed into the upper trough will pass from one trough to the other and into the pan, two finishing-receivers communicating with the pan, a valve for directing the flow of material into either one of the said receivers, agitating means in each receiver, outlets for the receivers, a condenser, a water-spray device therein, a pipe forming communication between the chamber and the condenser, and a suction-fan in said pipe so as to carry off the vapor as it is formed, substantially as described.

In testimony whereof I have signed my name to this specification in the presence of two subscribing witnesses.

JOHN C. FLEMING.

Witnesses:
WILL. A. BARR,
JOS. H. KLEIN.